United States Patent
Tausch et al.

[11] Patent Number: 5,811,784
[45] Date of Patent: Sep. 22, 1998

[54] EXTENDED WORKING RANGE DATAFORM READER

[75] Inventors: Mark Tausch, Westchester, Ohio; Ynjiun P. Wang; Timothy P. O'Hagan, both of Ft. Myers, Fla.

[73] Assignee: Telxon Corporation, Akron, Ohio

[21] Appl. No.: 494,435

[22] Filed: Jun. 26, 1995

[51] Int. Cl.$^6$ ........................................... G06K 7/10
[52] U.S. Cl. ........................................... 235/472; 235/462
[58] Field of Search ................................... 235/462, 472, 235/454, 455, 467

[56] References Cited

U.S. PATENT DOCUMENTS

| | | |
|---|---|---|
| 4,210,802 | 7/1980 | Sakai . |
| 4,409,470 | 10/1983 | Shepard et al. . |
| 4,542,528 | 9/1985 | Sanner et al. ............ 235/472 |
| 4,734,566 | 3/1988 | Senda et al. . |
| 4,766,300 | 8/1988 | Chadima, Jr. et al. . |
| 4,835,615 | 5/1989 | Taniguchi et al. . |
| 4,877,949 | 10/1989 | Danielson et al. . |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. ............ 235/462 |
| 5,081,343 | 1/1992 | Chadima et al. ........ 235/472 |
| 5,083,150 | 1/1992 | Nagasaki et al. . |
| 5,101,269 | 3/1992 | Shelley et al. ............ 235/88 |
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr. et al. . |
| 5,200,597 | 4/1993 | Eastman et al. . |
| 5,210,398 | 5/1993 | Metlitsky ............ 235/462 |
| 5,235,167 | 8/1993 | Dvorkis et al. . |
| 5,237,365 | 8/1993 | Miyazawa . |
| 5,243,666 | 9/1993 | Hasfeave et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. . |
| 5,291,009 | 3/1994 | Roustaei ............ 235/472 |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danelson et al. ...... 235/472 |

(List continued on next page.)

FOREIGN PATENT DOCUMENTS

| | | |
|---|---|---|
| 60-129891 | 7/1985 | Japan . |
| 63-67692 | 3/1988 | Japan . |
| 63-83886 | 4/1988 | Japan . |
| 60-264383 | 10/1990 | Japan . |
| 3-198175 | 8/1991 | Japan . |
| 5-242287 | 9/1993 | Japan . |
| 6-162247 | 6/1994 | Japan . |

OTHER PUBLICATIONS

PCT International Search Report dated Sep. 18, 1996 (two pages).

PCT International Search Report date Nov. 7, 1996 (one page).

*Primary Examiner*—Donald T. Hajec
*Assistant Examiner*—Thien Minh Le
*Attorney, Agent, or Firm*—Watts, Hoffmann, Fisher & Heinke Co. LPA

[57] ABSTRACT

A portable dataform reader includes a large F# optic assembly that provides a working range from about 2.5" to at least 8.5" in front of the reader while maintaining a broad field of view. The reader is capable of capturing a high signal to noise ratio image in under 0.01 seconds thereby making the reader highly tolerant to hand jitter. To accommodate the large F# optic and short exposure period, the reader is provided with an efficient high intensity uniform illumination module.

11 Claims, 9 Drawing Sheets

U.S. PATENT DOCUMENTS

| | | |
|---|---|---|
| 5,309,243 | 5/1994 | Tsai . |
| 5,314,631 | 5/1994 | Katoh et al. . |
| 5,315,095 | 5/1994 | Maron et al. . |
| 5,319,181 | 6/1994 | Shellhammer et al. . |
| 5,331,143 | 7/1994 | Maron et al. . |
| 5,332,892 | 7/1994 | Li et al. ................................ 235/462 |
| 5,340,973 | 8/1994 | Knowles et al. . |
| 5,345,266 | 9/1994 | Denyer . |
| 5,349,172 | 9/1994 | Roustaei ................................ 235/462 |
| 5,352,884 | 10/1994 | Petrick et al. . |
| 5,354,977 | 10/1994 | Roustaei ................................ 235/462 |
| 5,359,185 | 10/1994 | Hanson ................................ 235/472 |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. ...................... 235/462 |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,478,997 | 12/1995 | Bridgeall et al. . |
| 5,484,994 | 1/1996 | Roustaei . |
| 5,486,688 | 1/1996 | Iima et al. . |
| 5,496,992 | 3/1996 | Madan et al. . |
| 5,504,316 | 4/1996 | Bridgall et al. . |
| 5,559,555 | 9/1996 | Shimzu et al. . |

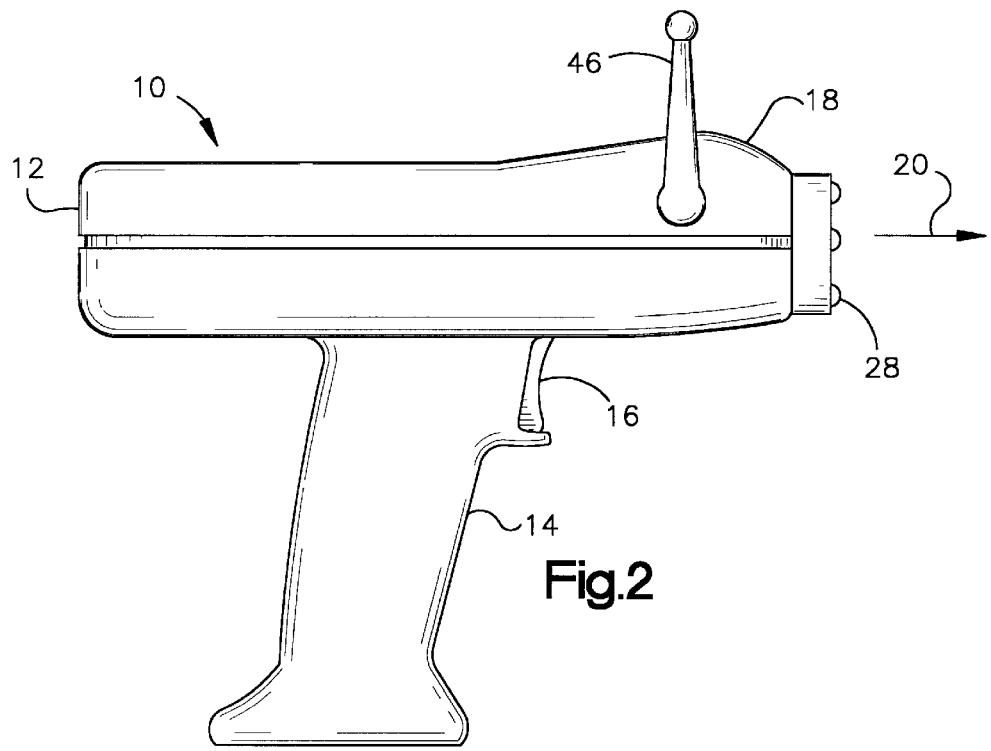
Fig.2
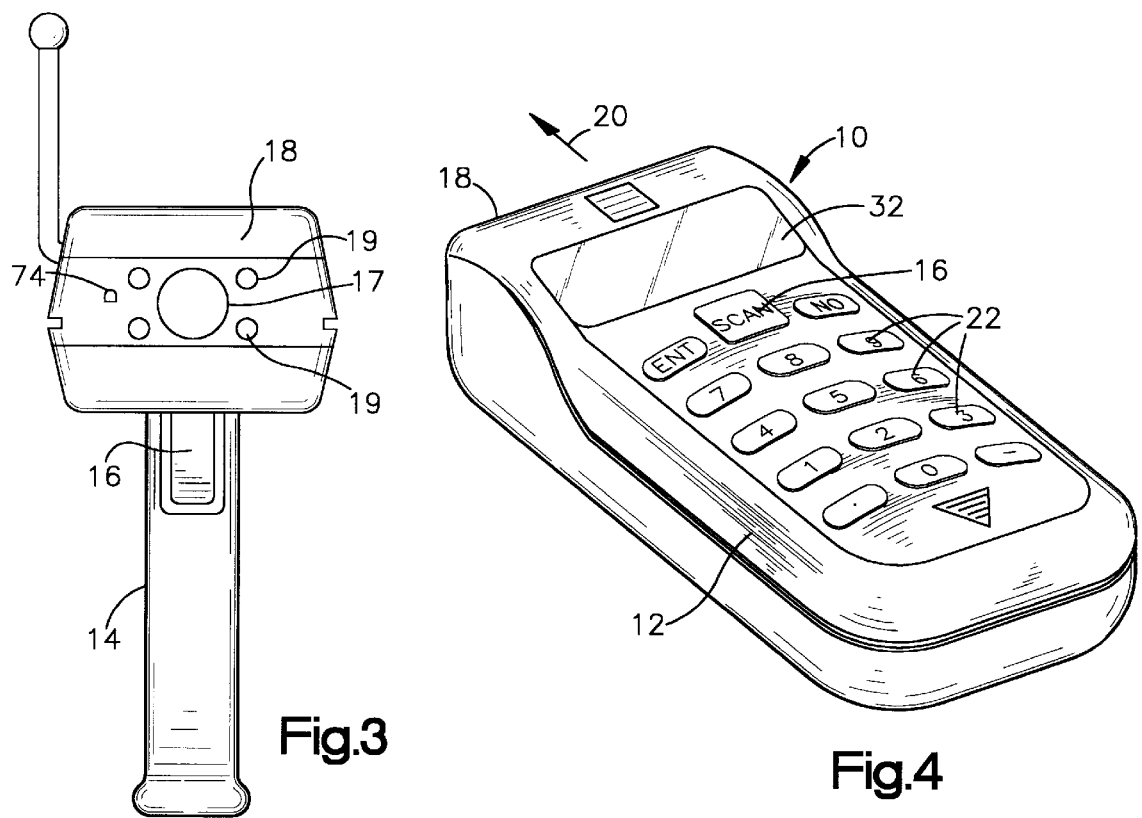
Fig.3
Fig.4

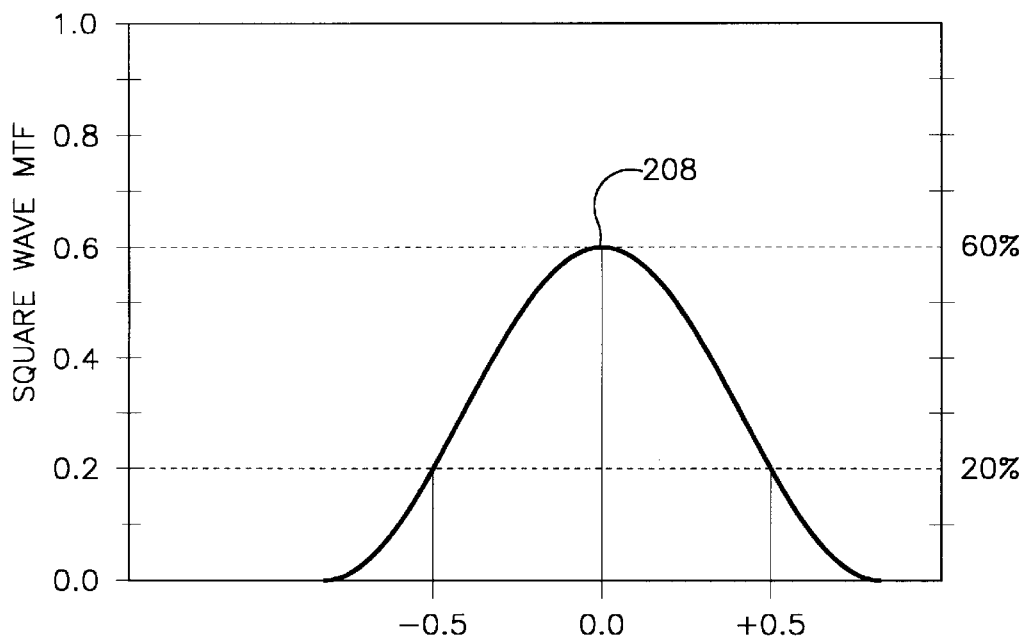
Fig.12  FOCUS SHIFT IN MILLIMETERS
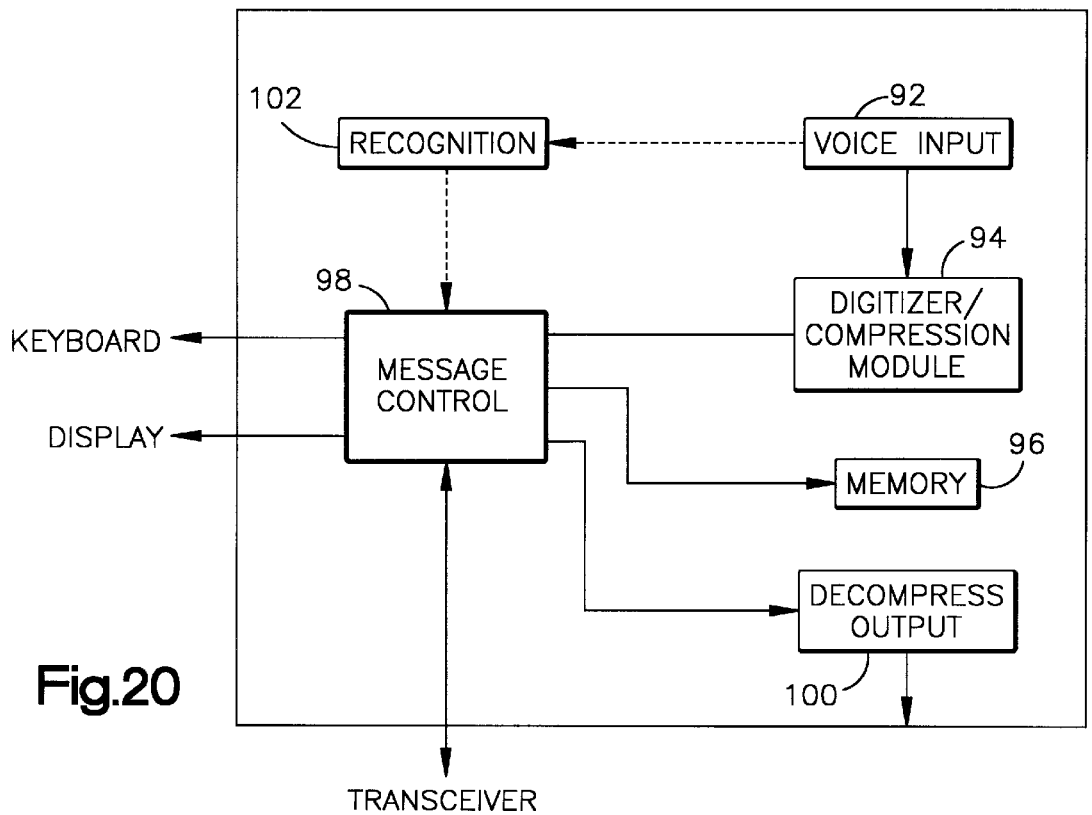
Fig.20

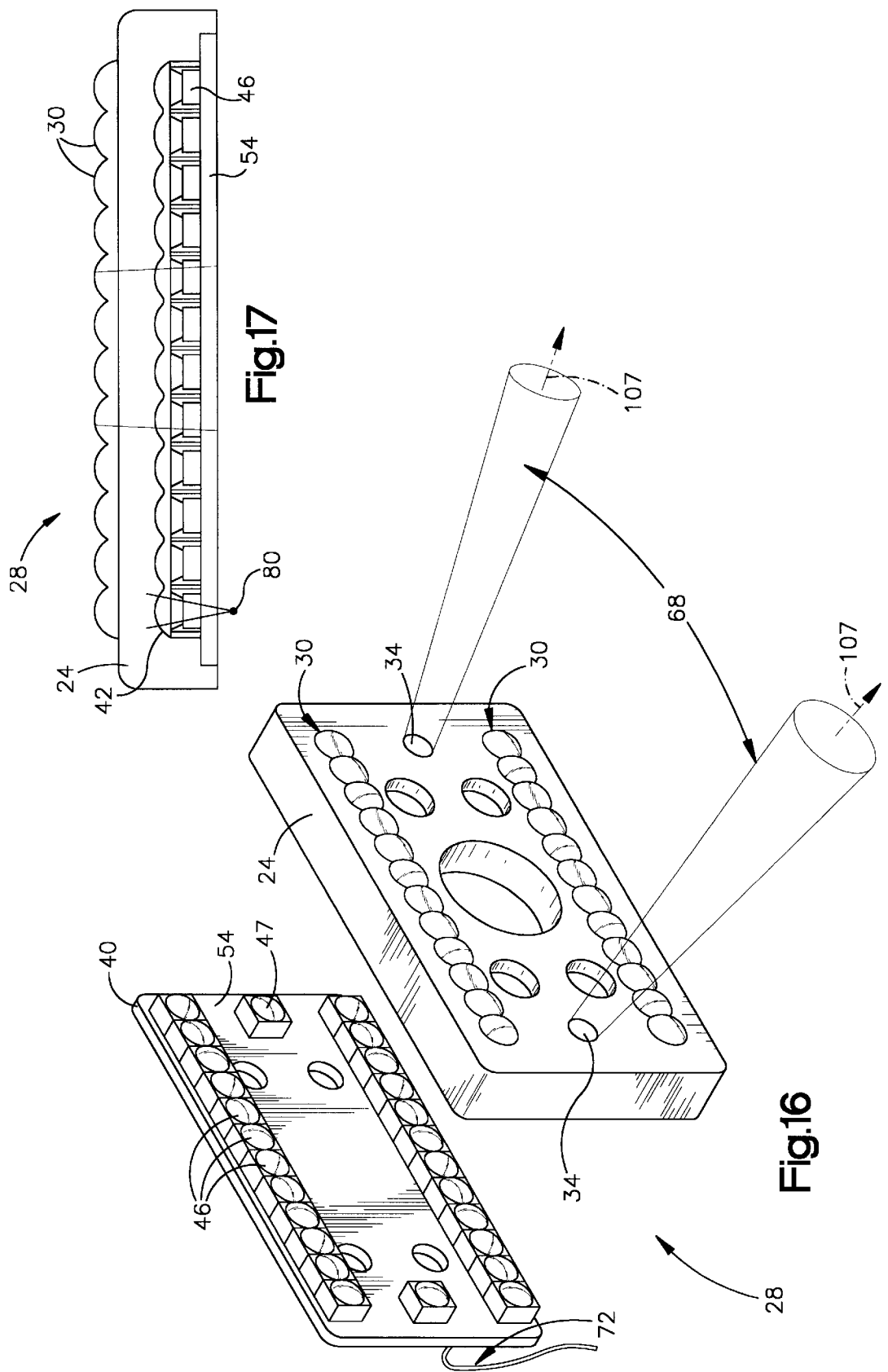

EXTENDED WORKING RANGE DATAFORM READER

The invention relates to dataform readers and methods for reading dataforms including barcodes, such as 1D and 2D codes, and other dataforms such as matrix codes. More particularly, the invention relates to dataform readers and methods which achieve high resolution imaging of the dataforms with an improved optical system having an increased working range, and an improved illumination system associated therewith.

BACKGROUND OF DATAFORMS

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes (e.g. UPC, C128, PDF417, etc.), matrix codes (e.g. Maxicode, Data Matrix, Code 1, etc.) and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a CCD reader, a laser scanner or other suitable device which is capable of distinguishing between different reflective values of light reflected data cells and synchronizing the data cell format for a particular dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark on light relationship in one orientation and a light on dark relationship in a different orientation. In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

BACKGROUND OF DATAFORM READER

Current art portable terminals with integrated laser barcode scanners or CCD barcode readers are not well suited for reading two dimensional dataforms. Laser barcode readers operate by projecting a narrow laser beam of light which forms an intensely illuminated spot on the barcode. Oscillating mirrors continually redirect the laser beam so that the spot moves in a sweeping pattern or a raster pattern. Generally a sweeping pattern refers to oscillation of the beam along the horizontal axis without any vertical oscillation. A raster pattern refers to a rapid oscillation along the horizontal axis and a slower oscillation along the vertical axis so that raster pattern appears to be a sweeping pattern moving up and down. A photodetector collects illumination from the entire target area. When the moving, or flying spot is incident on a highly reflective portion of the barcode, such as a white background, light reflected from the spot is incident on the photosensor. When the flying spot is incident on a less reflective portion of the barcode, such as a black bar, less light is reflected towards the photodetector.

A laser scanner does not have an internal synchronization mechanism. The laser scanner calculates the laser spot's relative horizontal position based on known self-synchronizing patterns in the 1D barcode. This can be referred to as a code self-synchronized system. A raster pattern laser scanner can read 2D stacked barcode such as PDF-417 because PDF-417 has particular row indicator patterns which are recognizable and used by the scanner for vertical synchronization. This system has very little rotation angle tolerance, because the scanner can not recognize a row indicator pattern or other codeword pattern unless the spot sweeps across the entire pattern.

A laser scanner can not read 2D matrix codes such as the Maxicode and the Datamatrix because such codes do not have row indicator patterns for vertical synchronization.

In addition to laser scanners, there exists 1D CCD array barcode readers. The CCD reader operates by imaging a long and thin target area onto a one-dimensional photodetector array rather than scanning a spot of illumination across the barcode symbol. If the reader is positioned relative to a 1D barcode so that the imaged target area falls relatively across the barcode. The barcode can then be decoded based on the run-length sequences of grayscale values derived from the pixels on which each bar and space of the code is imaged. Similar to the laser scanner, the 1D CCD has no vertical synchronization and must rely on row indicator patterns for vertical synchronization.

More recently, the CCD reader concept has been extended to two-dimensional CCD readers such as the TEC contact reader made by Tokyo Electric Company. A two dimensional CCD reader images an area onto a two-dimensional array of photodetectors. Such a device is capable of reading matrix codes because the 2-dimensional pixel array provides both horizontal and vertical synchronization. This reader has an inadequate illumination system. Therefore, the photosensor exposure time is very long and a small F# optic is used to image the dataform onto the sensor array. Because of this optic configuration the reader has no tolerance for relative movement between the dataform and the optic that may be caused by random hand jitter during the image capturing period and the reader has a very small working range (less than 0.5 inches) and field of view (about 1.2" square).

Current CCD readers include an optic configuration characterized by inadequate and non-uniform illumination, a long exposure time (approximately 0.03 seconds), and an optic system with a small F#. The exposure period and F# are configured to provide the photosensor array with enough accumulated illumination during the exposure period to provide a video signal with an adequate signal to noise ratio for decoding. The hand jitter, working range, and field of view problems are a direct result of the optic configurations.

The limited working range of current CCD readers is a result of the small F#. A small F# limits the optical system's ability to sharply focus an image of the target area onto the photosensor array over a large working range. There is a best focus distance in front of the optic system at which the sharpest image of the object will focus onto the sensor array. The sharpness of the image degrades as the object is moved closer to or farther from the object. The working range is determined by a near field cut off distance and a far field cut off distance at which the image sharpness degrades to an undecodeable level. The working range is very small for a small F# optic.

The limited field of view that is found in current readers is an attempt to gain working range without increasing the F#. By narrowing the field of view, an object of the same width within the field of view is imaged onto a greater quantity of photosensors, each barcode cell, although blurred, can still be decoded because each cell is imaged onto more pixels. The problem associated with a small field of view is that the reader cannot read a large barcode because it will not fit within the smaller field of view.

Other attempts to improve working range include auto-focus techniques. Auto-focusing techniques include moving parts which are susceptible to damage, particularly if used in portable dataform readers which can be easily dropped. Auto-focusing techniques are also generally slow in response time, which has been found to be unacceptable in the environments in which such dataform readers are used. Auto-focusing systems will further add significantly to the cost of the reader, making it prohibitive for general use.

Current reader illumination systems generally do not provide adequate illumination to accommodate a shorter exposure time or a smaller aperture. Current illumination configurations are generally characterized by a plurality of discrete LED assemblies, including the LED and an acrylic optic encasing the LED, assembled on a printed circuit board within the reader housing. The housing has a window through which illumination from the LEDs is projected towards the target area and reflected illumination is collected by the focusing optics of the reader.

This system suffers from non-uniform hot spots within the target area formed by each discrete LED assembly and from internal reflection illumination noise caused by illumination reflecting from the interior surface of the window into the optical system. Attempts to eliminate the hot spots include providing a frosted or holographic diffuser in front the LED assemblies. The diffuser has a low transmissive efficiency resulting in less illumination in the target area. The current illumination configurations do not provide either adequate or uniform illumination on a distant target to provide an image with decodeable contrast for the extended working range dataform reader operation.

Therefore there is a need to have a non-contact 2D imaging based dataform reader which can read 1D barcodes, 2D stacked barcodes and matrix codes omni-directionally. There is also a need to have such reader be a hand held reader with a high tolerance for hand jittering effects. Furthermore, there is a need to have such dataform reader achieve an extended working range without using an auto-focusing system and without sacrificing the field of view. Yet another need is to have an externally mounted illumination module to provide highly uniform and energy efficient extended range illumination without internal reflection illumination noise.

SUMMARY OF THE INVENTION

In accordance with this invention a portable dataform reader is provided that includes a large F# optic assembly that provides a working range from about 2.5" to at least 8.5" in front of the reader while maintaining a broad field of view. The reader is capable of capturing a high signal to noise ratio image in under 0.01 seconds thereby making the reader highly tolerant to hand jitter. To accommodate the large F# optic and short exposure period, the reader is provided with an efficient high intensity uniform illumination module.

To obtain the desired working range without narrowing the field of view, an optic system with an F# greater than 5.6 is provided. The optic includes at least one lens element. The lens element has at least one aspherical surface or one diffractive surface to provide for a flat image field.

An illumination module is secured to the front surface of the reader housing to avoid the illumination loss problem and the internal reflection illumination noise problem associated with placing the illumination source behind a window within the reader housing.

The illumination module includes a printed circuit board assembly including a plurality of surface mount LEDs secured to the front side of a printed circuit board. The board is bonded into a cavity in the backside of a durable acrylic lens array. The lens array operates to direct uniform and intense illumination towards a target area in front of the reader.

In the preferred embodiment, the illumination module has an aperture in the center and the reader module is positioned to gather light reflected from the target area through the aperture. This configuration assures illumination directed from the lens array of the reader module is aligned with the field of view of the reader module.

Furthermore, because the reader of this invention is intended for portable use, this invention provides for a reader with a spread spectrum radio which operates to couple the reader with a computer throughout an IEEE 802.11 compatible network. The spread spectrum radio can be used to transmit decoded dataform data, photographic image data in a compressed format, or compressed data files representing voice messages.

Also in accordance with this invention, the dataform reader includes user interface devices such as a keyboard, display, touch panel, microphone and speaker which operate with various circuits to improve the functionality of the reader.

For a better understanding of the invention, together with other and further objects, reference is made to the accompanying drawings and the scope of the invention will be pointed out in the accompanying claims.

BRIEF DESCRIPTION OF THE DRAWINGS

FIG. 2 shows a side view of a hand held portable dataform reader according to this invention.

FIG. 3 shows a front view of the housing of the portable dataform reader according to this invention.

FIG. 4 shows a perspective view of an alternative hand held portable dataform reader according to this invention.

FIG. 12 shows a MTF plot for a preferred embodiment of the optic assembly according to this invention.

FIG. 16 shows an exploded perspective view of the illumination module of this invention.

FIG. 17 shows a side cross sectional view of the illumination module of this invention.

FIG. 20 shows a block diagram of the voice mail system according to the present invention.

DETAILED DESCRIPTION

Figure 1:
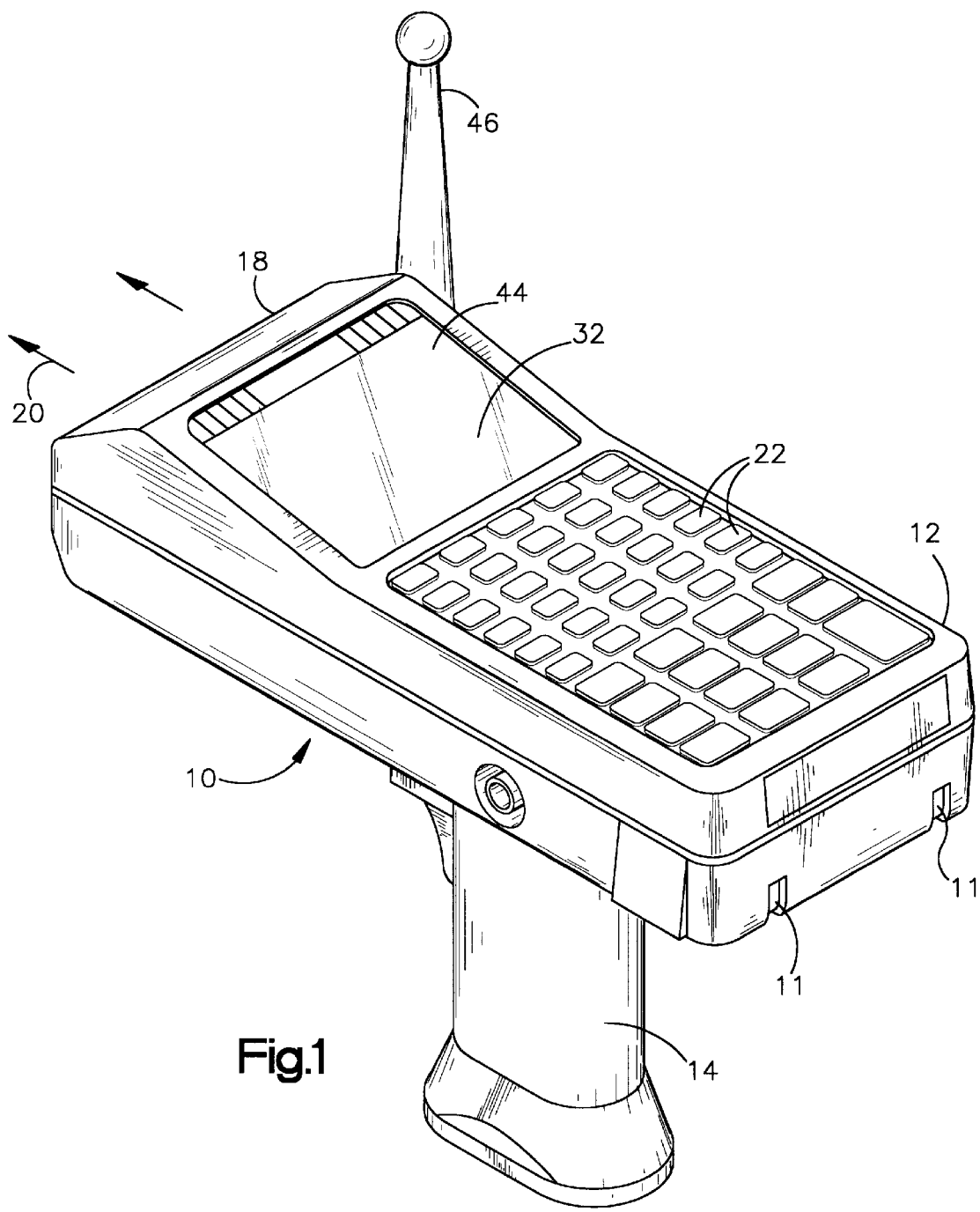
FIG. 1 shows a perspective view of a hand held portable dataform reader according to this invention.
Figure 5:
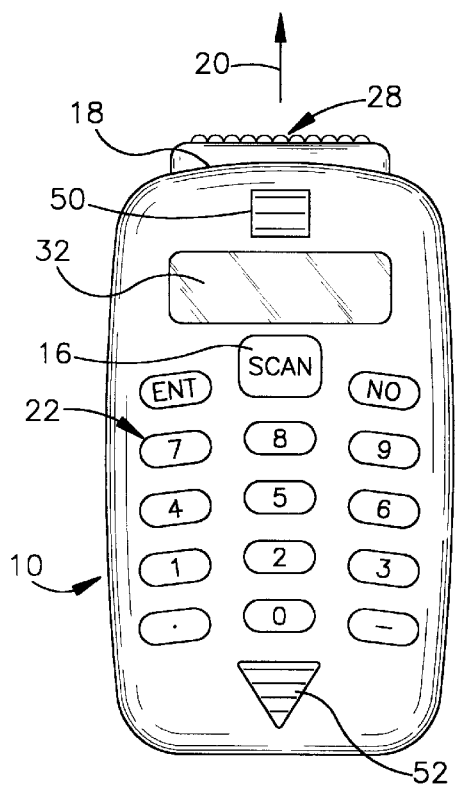
FIG. 5 shows a top view of the portable dataform reader of FIG. 4.
Figure 6:
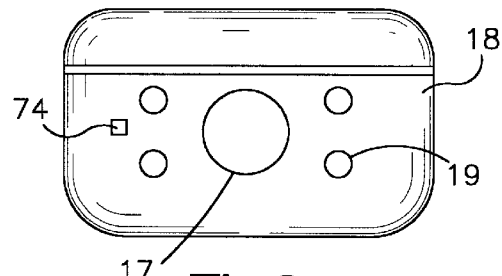
FIG. 6 shows a front view of the housing for the portable data terminal of FIG. 4.
Figure 7:
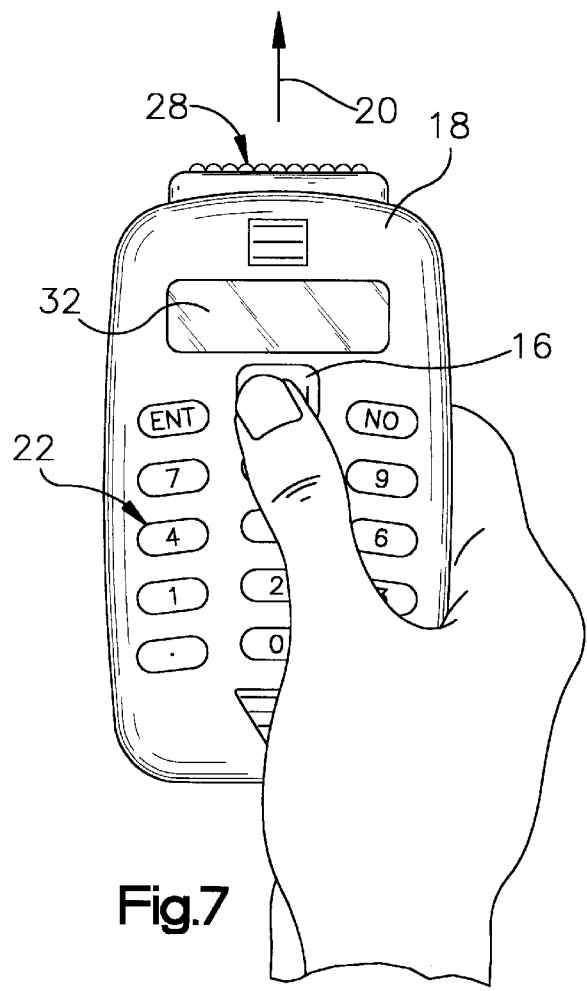
FIG. 7 shows hand held operation of the portable dataform reader of FIG. 4.

The portable dataform reader of this invention can have several housing configurations, two of which are generally shown in FIGS. 1–6. Like numerals are used to identify similar parts, wherein the housing shown in FIGS. 1–3 is generally a gun shaped reader 10 with a housing 12, forming an upper enclosure, and a handle portion 14 extending below the upper enclosure. The housing is constructed of a suitable impact resistant plastic that provides both durability and light weight. A trigger switch 16 is appropriately mounted and used to provide a signal to initiate a dataform reading session. A plurality of key switches 22 and a display screen 32 with an overlaying touch panel 44 are visible on the upper surface. An illumination module 28 is secured to the forward end of the housing 18 so that the noise effects and illumination loss associated with placing illuminators within the housing and behind a window are eliminated. The forward end of the housing 18 is shown in FIG. 3 without the illuminator module 28. A generally circular shaped aperture 17 is formed in the forward end 18 so that a dataform positioned to the front of the reader may be read by a reader module positioned in the forward end of the upper enclosure. The housing also includes four holes 19 for securing the illuminator module to the front of the housing 18 with screws. The terminal 10 shown in FIGS. 4–6 is generally a palm sized terminal configured to be held in the palm of the operators hand as shown in FIG. 7. A plurality of key switches on the upper surface 22 are positioned to be operated by the same hand holding the terminal. Also on the upper surface is a display screen 32 with an overlaying touch panel 44. The housing 12 is constructed of a suitable impact resistant plastic for both durability and light weight. A trigger switch 16, to initiate a dataform reading session is located at the center of the upper surface to enable activation by the operator's thumb. The illumination module 28 is secured to the forward end of the housing 18. The forward end 18, shown without the illumination module 28 in FIG. 6, includes a generally circular shaped aperture 17 so that a dataform positioned in the front of the terminal 20 may be read by a reader module positioned in the forward end of the terminal.

Figure 8:
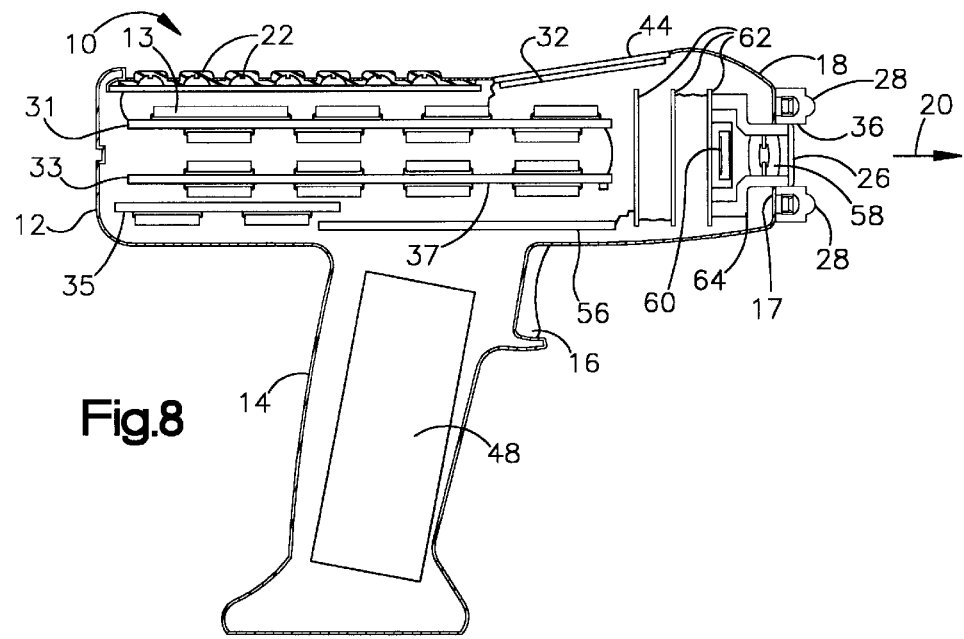
FIG. 8 shows a cut away side view of the dataform reader of FIG. 1.
Figure 9:
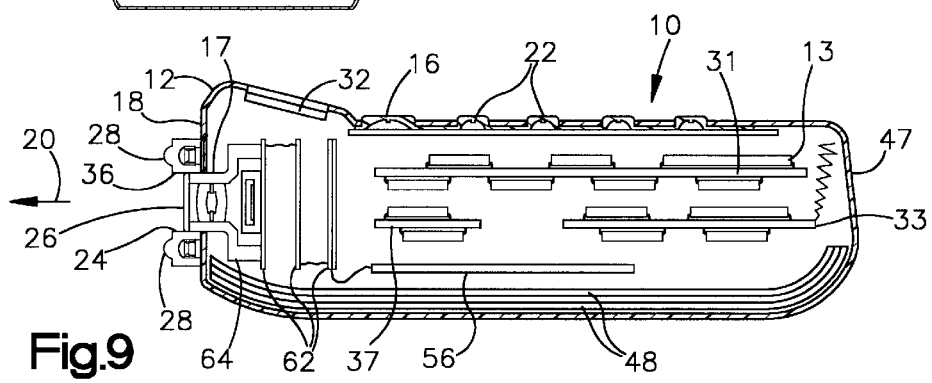
FIG. 9 shows a cut away side view of the dataform reader of FIG. 4.

Referring to FIGS. 8 and 9, which show a cut away side view of the reader of FIGS. 1–6, it can be seen that a reader module 26 is positioned inside of the reader housing immediately behind the front surface 18. The camera housing 64 projects through the aperture 17 in the reader housing and aperture 36 in the illumination module. A seal (not shown) may be placed around the camera housing nose 64 to create a tight seal between the camera housing and the reader housing 12 to prevent dirt and moisture from entering the interior of the reader housing through the aperture 17.

Figure 10:
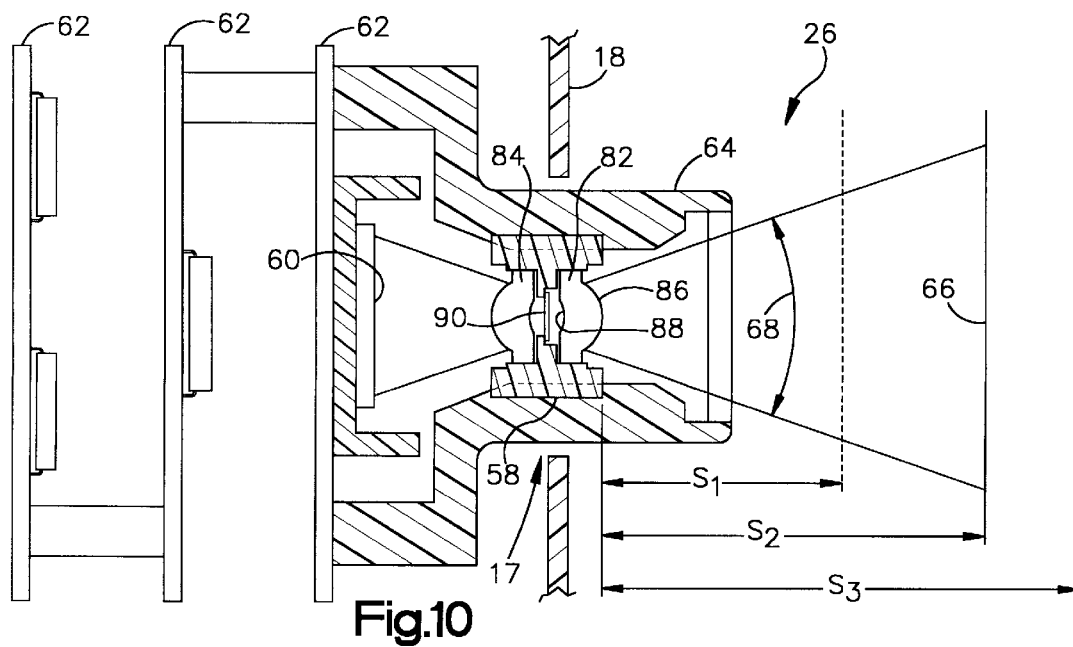
FIG. 10 shows a diagrammatic top view of the reader module in accordance with this invention.

FIG. 10 shows a top view of the reader module 26. The module includes a board camera assembly (shown as a three board assembly) 62 with a two-dimensional array of photodetectors 60. The reader module 26 also includes an optic assembly 58 for focusing an image of the target area 66 onto the two dimensional array of photosensors 60. A camera housing 64 shrouds ambient light from the photosensor array 60 and positions the optic assembly 58 such that the photosensor array 60 is substantially at the image plane.

Based on the position between the optic assembly and the photosensor array, there exists a best focus position S2 in front of the optic assembly 58 at which an image of the object in the object field 66 will be sharpest on the sensor array 60. The image gradually degrades as the object is moved towards the near field cut off distance S1 and a far field cut off distance S3. The optic assembly 58 also has a field of view 68 which is wide enough to image large dataforms at the far field S3 and still provide a large image of a small dataform located at the near field S1. In the preferred embodiment the optical assembly 58 has a working range from about 2.5" to at least 8.5" from the front surface of the optical assembly 86, with best focus distance being at 5.5". The preferred field of view corresponds to a target surface 5 inches long by 3.75 inches wide at 8.5" from lens surface 86.

The sharpness of the image of an object at the best focus position S2 is determined by the resolution of the optic system. The resolution is the optics ability to transfer the contrast between dark and light areas of the object field to the image formed at the image plane. The ability of an optic system to transfer contrast is quantified by the through focus Modulation Transfer Function (MTF).

Figure 11B:
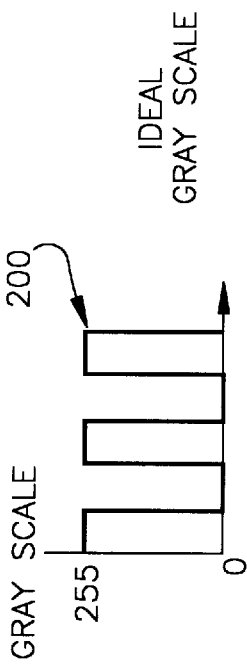
FIGS. 11a–11d conceptually show the calculation of MTF.
Figure 11D:
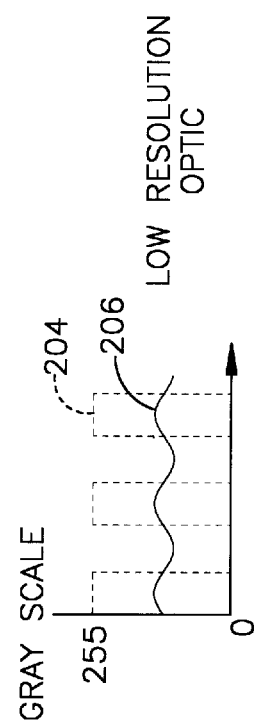
Figure 11A:
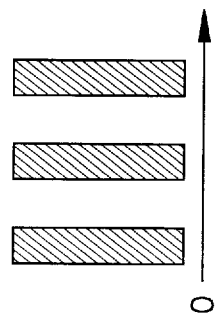
Figure 11C:
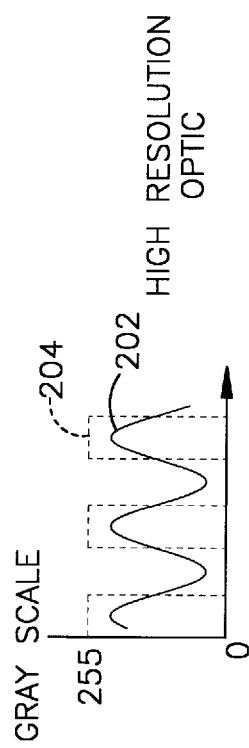

FIGS. 11a to 11d show conceptually the optical performance measured by MTF. Referring to 11a, a plurality of black bars and white spaces of equal size are positioned in a target area and focused to an image by the optic system. If the optic system were perfect, the image would be identical. However, because the optic is not perfect, the image will have a loss of contrast, that is the dark areas will be a little lighter and the light areas a little darker. The darkness of an image area is measured by a grayscale value with a grayscale value of 0 being very light and a grayscale value of 255 being very dark. Referring to FIG. 11b, if the grayscale values of the bar and space pattern of the perfect image are sampled perpendicularly across the bars and spaces, the plot of the perfect grayscale would be as shown by 200. FIG. 11c shows a grayscale plot through an image formed by a high resolution optic. It can be seen that the actual grayscale plot 202 has a lower peak to trough amplitude than the perfect grayscale plot represented by dashed line 204. FIG. 11d shows a grayscale plot through an image formed by a lower resolution optic. It can be seen that the peak to trough amplitude of the actual grayscale plot 206 is much lower than the amplitude of the ideal plot represented by dashed line 204. MTF is the fraction of the actual grayscale amplitude plot divided by the ideal grayscale amplitude for a particular bar spacing. Therefore, a higher resolution optic has a higher MTF.

FIG. 12 shows a through focus MTF plot for the preferred optic 58 for the extended working range reader. The peak to trough amplitude ratio at the image plane is 60% as shown by 208 for a bar space pattern of 50 line pairs per millimeter (50 bars and 50 corresponding spaces in a 1 mm wide area). It can be seen that the MTF decreases when measured at a small offset from the image plane. At 0.5 mm shift from the image plane, the MTF has degraded to 20%.

Figure 13:
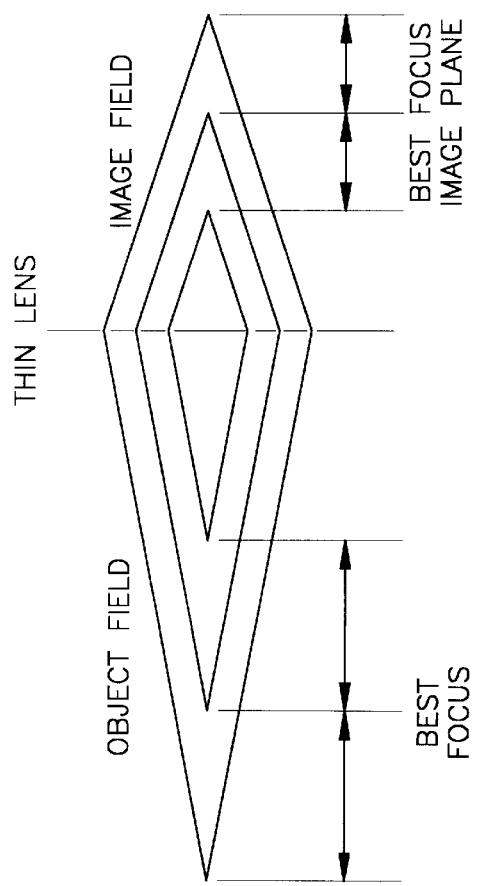
FIG. 13 shows a diagrammatic representation of image field shift in relation to object field shift.

Referring to FIG. 13, when an object in the object field is shifted closer to or farther from the reader than best focus, the sharpest image would be formed at a correspondingly shifted image plane. Because the position of a photodetector does not change with respect to the optic, the photodetector is not aligned with the shifted image plane. Therefore, the MTF measured at the photodetector will be a degraded MTF corresponding to the image plane shift.

Therefore, the working range in the object field is determined by the amount of image plane shift that can occur before the MTF degrades to an undecodable level. The working range cut-off distance will correspond to the image plane shift that causes MTF to drop to 15% at 50 line pairs per millimeter.

The above stated working range can be achieved by an optic having a through focus MTF (modulation transfer function) of at least 40% at 50 cycles at the best focus position and at least 15% at a+−0.5 mm focus shift from the image plane.

MTF is related to the aperture, or the size of the bundle of light rays that is allowed to pass through the optical system by the following equation:

$$MTF = \lambda / F\#$$

The F# is the ratio of the effective focal length of the optic (that is the distance between the second principal axis and the image plane) divided by the diameter of the aperture. $\lambda$ is the wavelength of illumination. It can be seen that a larger F# optic, corresponding to a smaller aperture, will improve the MTF and correspondingly improve the working range.

The line spacing used to measure MTF at the image plane must be chosen based on the resolution of the photosensor array. The preferred photo sensor array has about a 6.5 micron pixel spacing. The smallest dataform cell must be imaged onto 1.5 pixels for decoding. Therefore, the image of the smallest dataform cell width must be about 10 microns (1.5×6.5). A line spacing of 50 line pairs per millimeter corresponds to 10 micron line spacing. Therefore, 50 line pairs per millimeter line spacing should be used for determining MTF.

Referring again to FIG. 10, the field of view 68 is based on the desired dataform cell size that will form a 10 micron image on the photo sensor. A typical small data form will have 0.0066" (6.6 mil) cell spacing. The field of view angle 68 corresponds to a 0.0066 inch object at best focus position S2 forming a 10 micron image at the photo sensor.

Figure 14:
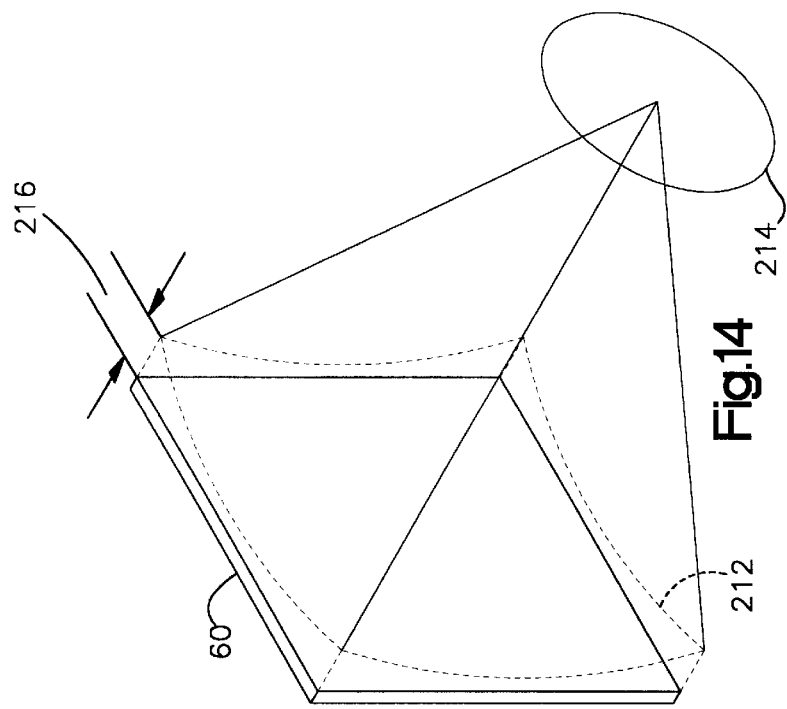
FIG. 14 shows a diagrammatic representation of field flatness.

While the F# of the optical assembly is chosen to accommodate necessary image sharpness for the desired working range and field of view, the lens surfaces must be chosen to achieve a flat field. FIG. 14 conceptually shows field flatness. The photosensor array 60 is flat. An ideal image plane would be flat corresponding to the photo sensor array. However, the actual image plane 212 is not flat. The curvature of the image plane causes the photo sensor array 60 to be offset by a distance 216 at certain portions of the image. This offset is equivalent to the image plane shift, discussed earlier, that degrades MTF. To assure that the image plane is substantially flat and corresponds with the photo sensor array across the entire field, an aspherical lens surface on at least one surface of the optic assembly should be used.

An alternative embodiment for improved field flatness includes a lens with a diffractive optical surface producing a diffractive coefficient which refracts light incident upon the lens as an emerging wave front which arrives at focus at the image plane. Constructive interference of the light rays produced by the diffractive optic form a substantially flat and distortion free image at the image plane. Diffractive optical surfaces allow a high degree of correction in a single optical element and also provide color correction of a broad band optical system. A diffractive system also reduces the need for multiple lens elements resulting in cost savings in terms of fabrication.

Figure 15:
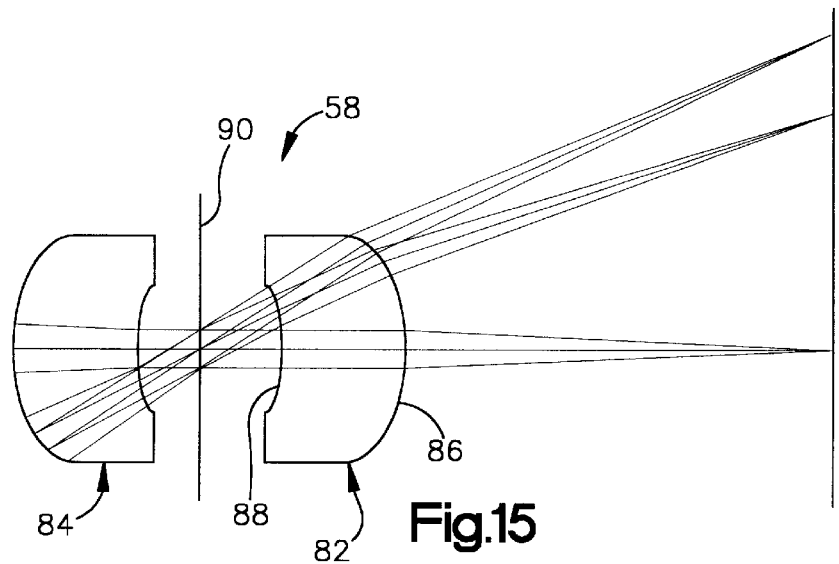
FIG. 15 shows a diagrammatic representation of the optic assembly in accordance with this invention.

Other optical distortions include field curvature, astigmatism, spherical aberration, coma, and chromatic aberration. These distortions will effect cell extraction and decoding efficiency. Referring again to FIG. 15, one of the preferred embodiments of the optical systems for the dataform reader will include a symmetrical lens structure to correct distortion. Two substantially identical lenses 82 and 84 will be positioned with mirrored symmetry about the aperture 90. The symmetrical design combined with the aspherical surfaces substantially limits distortion because each lens has distortion causing aberrations which cancel each other. The symmetrical system is also advantageous in that only one lens configuration needs to be fabricated to provide the lens assembly. In the preferred embodiment, surface 86 is aspherical having a magnitude and shape defined as an even asphere having a radius of curvature of 1.5298 mm, a conic constant of −0.019890, a 6th order aspheric deformation coefficient of 0.0096 mm, an 8th order coefficient of −0.0057, and a 10th order coefficient of 0.0023. The surface 88 is a spherical surface with a radius of curvature of 1.6004 mm. The aperture 90, measures 0.3606 mm and is positioned between the lenses 82 and 84 as shown to provide the optical assembly an F#13. The lens diameter is not critical to this invention.

Because the optic assembly is used in a portable reader, it is desirable that the assembly be light weight and impact resistant. In the preferred embodiment, the optical material used for fabricating the lens element is plastic. A plastic optic will reduce the weight of an equivalent glass assembly by 60% and provide a system much more impact resistant. Another benefit of plastic optics is that the costs associated with grinding aspherical surfaces on glass optics is avoided. An aspherical surface is easily formed by injection molding a plastic optic. While the above optic provides the desired attributes of the invention, those skilled in the art are able to provide other optics with similar performance characteristics.

Because the desired working range and field of view of the reader of this invention dictate that the optic system must have a large F# (F#5.6 or greater). The photosensor array exposure period and illuminator system for the reader must provide for adequate exposure of the photosensor array. To reduce the hand jittering effect, the exposure period must be 0.01 seconds or less, which is substantially less than current CCD readers. Therefore, the illumination system of this invention must provide adequate illumination to accommodate the large #F# and short exposure time.

The preferred board camera assembly 62 is the model number CCM-M25 CCD sensor array produced by Sony Corporation. Proper exposure of the sensor array requires an object field illumination of 0.3 lux assuming an exposure period of 0.03 seconds and an F#1.2. To determine the proper object field illumination of the preferred embodiment for a 0.01 second exposure period and an F#13, the following formula is used:

$$\frac{(\text{Illumination intensity})(\text{Exposure period})}{(F\#)^2} = \text{Constant}$$

Therefore, the minimum required object field illumination for the reader of this invention is 106 lux at the far field cut off distance.

Referring to FIG. 16, which is a perspective explosion view of the illumination module 28, it can be seen that module 28 includes a lens array 24 and a printed circuit board assembly 40. The printed circuit board assembly 40 includes a plurality of surface mount LEDs 46 secured to a printed circuit board 54. Printed circuit board 54 includes printed conductors and power lead 72 operative for supplying power to the LEDs 46. A suitable surface mount LED is produced by the Marktech Corporation of Latham, N.Y., as Part No. MTSM735K-UR or MTSM745KA-UR. Each provides luminosity of 285 mcd over an illumination field of about 68°. The small footprint of the LED 46 provides for twelve to be placed in a row measuring less than 1.5". The printed circuit board assembly 54 includes 24 LED's 46 in two rows providing 6840 mcd of uniform illumination over a 68° field.

The lens array 24 includes a plurality of exposure illuminator lens elements 30 all of which are positioned in front of an LED 46. The exposure illuminator lens elements 30 direct the 68° field of illumination from each LED into a smaller uniform illumination field corresponding to the field of view of the optic (about 50°).

Referring to FIG. 17 which shows a cross section of the assembled illumination module 28, it can be seen that each exposure lens cell 30 has an inner lens surface 42 and a focal point 80. By locating the LED between the focal point 80 and the interior surface 42, the lens cell acts as a light directing element rather than an imaging element thereby avoiding hot spots in the target area and providing a highly uniform illumination. The 68° field of illumination from each LED 46 is gathered by each lens cell 30 and directed into a field corresponding to the optical system field of view which is smaller than 68°. Furthermore, because lens cells 30 overlap, there is "cross talk" between the optical surfaces such that illumination from one LED may be directed towards the target area by a cell associated with another LED. This illuminator system is called a sub-focal-length illuminator. The intensity variation of illumination from this system is less than 20% across the target area.

Referring back to FIG. 16, two targeting lens elements 34 positioned over two targeting LEDs 47 project two pencils of targeting illumination 107, forming hot spots, into the target area at angles corresponding to the optical systems field of view 68. The hot spots are visible to the operator and facilitate positioning of the portable dataform hand held reader so that the target dataform is within the field of view of the optical system.

The lens array 24 forms the front surface of the illumination module protecting the printed circuit board assembly 40 from physical impact as well as from dirt, moisture and other harmful elements found in the environment. Therefore, the lens array 24 is preferably molded of an impact resistant acrylic or other suitable material that has a high illumination transmissivity and durability necessary for the environment in which a portable hand held dataform reader is operated. To further protect the printed circuit board assembly 40 from harmful elements in the environment, a conformal coating is applied to the board assembly 40 and the assembly is bonded into a cavity in the back of the lens array 24 with a cyanoacrylate, UV curing or structural adhesive.

While in the preferred embodiment, the lens array provides uniform illumination to the target area, this invention can also optionally provide for a frosted or holographic diffuser placed in front of the lens array to further improve uniformity.

Figure 18A:
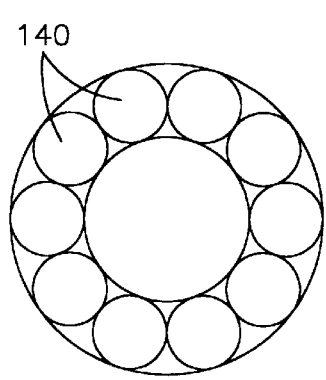
FIGS. 18a and 18b show an alternative illuminator module in accordance with this invention.
Figure 18B:
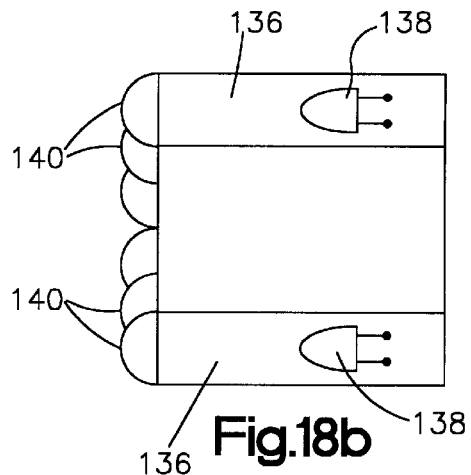

FIG. 18a and 18b show the front and side view of alternative embodiment of an illumination module 28. The module includes a plurality of discrete LED assemblies 138 encased in the acrylic ring 136. A circular array of optics 140 is formed on the front of the ring. The optics direct the illumination into a field corresponding to the field of the view of the optic. The cross talk caused by the solid ring encasing the illuminators and optics provide for an even field of illumination.

Figure 19:
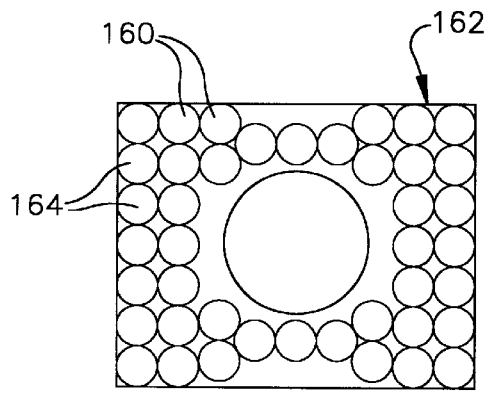
FIG. 19 shows another alternative illuminator module in accordance with this invention.

FIG. 19 shows a front view of a multiple source LED assembly. A plurality of LED dies 160 are molded into a single acrylic casing 162. The casing includes an optic surface 164 in front of each die to conform the field of illumination to the field of view of the optic. The close spacing of the dies 160 that can be achieved combined with cross talk provides an even field of illumination. Construction of this device may also be accomplished by bonding the LEDs to the back surface of the casing 162 with a cyanoacrylate adhesive that has the same index of refraction as the casing 162.

Referring again to FIGS. 8 and 9, it can be seen that the interior of the housing includes a plurality of printed circuit boards including decoder board 56 and control board 31. The board camera 62 is operably connected to the decoder board. The output signal from sensor array 60 is a non-gain corrected raw video voltage signal. The voltage, at particular time increments, represents the accumulated charge on individual pixels. The board camera assembly 62 includes circuitry for generating a clock signal operative for driving the readout of the sensor array 60, exposure control circuitry for adjusting the exposure time for each field, gain control circuitry operative adjusting the gain of the raw video signal and other circuitry operative for generating a composite video signal from the raw video signal.

Typical board cameras only have two operational states, "off" and "read-out". The off state corresponds to a complete power shut down of the board camera. The "read-out" state corresponds to continuous generation of a video signal. Such a device is not practical in a portable dataform reader because it has a power up latency time, that is the period of time required to generate a stable video signal when transitioning from the "off" state to the "read-out" state of over 1 second. Because a portable dataform reader must provide a sub-second user response time, the board camera must remain in the "read-out" state continually. However, when in the "read-out" state, the device consumes too much power and would drain the batteries of a typical portable product within an hour.

The preferred board camera 62 of this invention may have three operational states, "off", "ready", and "read-out". The "off" state and the readout state correspond to equivalent states in a typical board camera. However, in the "ready" state, power remains on to those circuits that cause the long power up latency and power is not applied to circuits that have a shorter latency. Particularly, power is not applied to circuitry that causes the clocking signal for sensor array readout. When in the readout state, the video signal from the board camera is transferred to the decoder board 56. The decoder board 56 includes image processing circuitry operative to decode the dataform in the image area and transfer the decoded results to the control board 31, preferably through a serial interface. An appropriate decoder system is described in U.S. patent application Ser. No. 08/443,909 filed May 17, 1995, and U.S. patent application Ser. No. 08/456,113, now issued as U.S. Pat. No. 5,637,849 filed May 31, 1995, with the contents of both applications are hereby incorporated by reference. Other decoder systems known in the art are also contemplated by this invention.

Decoder board 56 also controls the dataform reading session by controlling the operational states of the board camera and supplying exposure and targeting power to the illumination module on a mutually exclusive basis. The control board 31 or the trigger switch 16 can send a signal to the decoder board 56 to initiate a reading session.

Because the dataform reader module 26 captures an image of the target area, the device, in addition to capturing the image of a dataform, can be used to photograph an object in the target area. For example, an operator can use the reader module to photograph a damaged product and also capture an image of a dataform associated with the damaged product. When a photograph image is captured, the decoder board will transfer a digital image, such as a bit map, of the image to the control board 31.

The control board 31 includes a serial output port coupled to a connector on the housing operative to transfer the decoded data or image data to a remote terminal through a cable connection (not shown). The connector may be a traditional pin connector to which a mating connector is secured. Alternatively, as shown in FIG. 1, the connector may be conductive contact surfaces 11 on the exterior of the housing 12 which align with mating contact surfaces when the dataform reader is placed in a docking station.

Because the dataform reader of this invention is intended for portable use, a wired connection to a host computer is impractical in many situations. Therefore, the reader includes a spread spectrum radio board 33 providing a wireless link between the control board 31 and a remote host computer. External antenna 46 as shown in FIG. 8, or internal antenna 47 as shown in FIG. 9, operate to improve reception. The spread spectrum board 33 includes digital and analog circuitry for transmitting and receiving data in a wireless network such as an IEEE 802.11 compatible direct sequence spread spectrum or frequency hopping spread spectrum network.

Because the spread spectrum radio, the dataform reader module and the illumination module all draw significant current from a power cell 48, the radio should not operate during a dataform reading session and a dataform reading session should not start during communication to limit peak current draw. Therefore, the radio and the circuitry controlling the dataform reading session provide blocking signals to each other to assure that power is not being drawn simultaneously. The blocking signal from the radio to the dataform reading circuitry will prevent the initiation of a reading session. The session will be delayed until the signal desists. The blocking signal from the dataform reading circuitry to the radio will prevent the radio from sending or receiving data packets. Therefore, the network transmission protocol must be such that the radio in the portable dataform reader has complete control over when to transmit a packet and when it can receive a data packet. One such network protocol is the reverse poll protocol as described in U.S. Pat. No. 5,276,680 and assigned to Telesystems S/W Inc., the entire contents of which is hereby incorporated by reference.

In the reverse poll protocol network, the portable device radio may transmit data packets to a network access point at any time, subject to the carrier frequency being free. However, the access point can only send a packet to the portable device within a time window following receipt of a packet from the portable device. To assure that the access point has enough opportunities to transmit data to the portable, the portable will periodically send packets even though they contain no significant data.

While the spread spectrum radio is effective for transmitting the decoded contents of a dataform, the radio's limited bandwidth makes it impractical for transmitting an entire un-compressed image. An image compression algorithm useful to reduce the size of a digital image file is the two-dimensional wavelet transform as described in *A 64 kb/s Video Code Using the 2-D Wavelet Transform* by A. S. Lewis and G. Knowles, published in IEEE Computer Society Press, Order Number 2202. For example, the HARC wavelet transform system, available from Houston Advance Research Center in Houston Tex., can be used to compress the photographic image before it is transmitted with an image compression ratio of up to 400:1.

Because the dataform reader is intended for portable use, it is quite possible that an operator working at a remote location of the facility may need to request supervisory instructions while capturing dataforms. Therefore, the dataform reader of this invention includes a voice mail processing board 37 so that the operator may verbally communicate with others through the spread spectrum network. Referring to FIG. 20, a block diagram of the voice mail circuitry is shown which may be embodied in a microprocessor system or voice mail processing board 33 and control board 31. A voice message is input through an audio input circuit 92 which can include an internal microphone or a port for connection to an external microphone which will be discussed in more detail later. A digitizer/compression module 94 will create a digital data file representative of the audio input.

Prior to transmitting the message, the message control unit 98 will prompt the operator to identify the addressee. The prompt may take the form of an audible signal to the operator through the audio output circuit 100 (discussed later), or a display screen message.

In a time window following the prompt, the operator must identify the addressee. This can be done through the keyboard 22 or touch panel 44 (shown in FIGS. 1–6). Alternatively, the addressee may be identified by audio input. In this embodiment, voice recognition circuitry 102 will operate to convert the audio signal to a digital address.

The message control unit 98 will add the address to the message and relay the message to the spread spectrum transceiver for broadcast to the addressee. It should be appreciated that the voice mail system could require operator identification of the addressee before or after input of the message.

The message control unit 98 operates to receive data files representative of incoming voice mail messages and stores such messages in memory 96. Upon receipt of an incoming message, the control unit 98 notifies the operator of receipt through the audio output circuit 100, the display screen or a dedicated illuminator.

Upon an operator prompt to output the voice mail message, the control unit 98 will retrieve the data file from memory. A decompression module will convert the data file to an analog signal and audio output circuitry, which may include a speaker or a port for a remote speaker or headset will output the message. The operator prompt to output the message may be through the keyboard 22, touch panel 44 or the voice input circuit 92.

After output of the message, the voice mail unit of this invention can optionally store the message for later playback or erase the message. In conjunction with storage or erasure, the message may be forwarded or responded to. The control unit will prompt the operator to input the various permutations of these options. If the message is stored, the digital data file will remain in memory 96. If forwarded, the data file, or a copy, will be appropriately addressed and transmitted to the spread radio 33.

If the respond option is selected, the identity of the address of the response message is known and the control unity 98 prompts the operator to input a response message. The digital data file representative thereof is sent by the spread radio.

Figure 21:
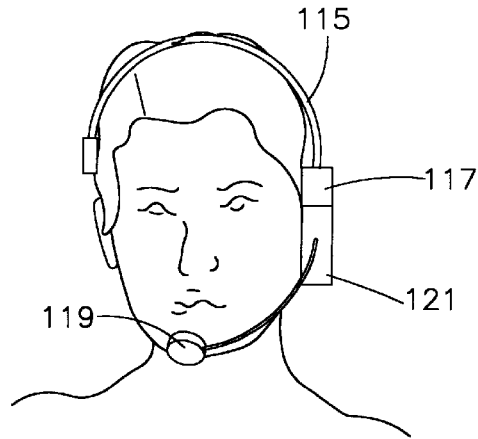
FIG. 21 shows a wireless headset in accordance with this invention.

Referring to FIG. 5, the speaker 50 and the microphone 52 are preferably positioned so that the reader may be held along the side of the operators face like a telephone set for communication. Referring to FIG. 21, the speaker and microphone are embodied in a wireless headset. The headset includes a headband 115 for holding the device on an operators head, a speaker 117 positioned near the operators ear and a microphone 119 positioned near the operators mouth. A micro-radio module and power source are located in a housing 121 attached to the headset.

Referring again to FIG. 8, the reader includes a similar micro-radio embodied on board 35 for transcieving audio signals with the headset. The micro-radio operates on a narrow band modulation scheme wherein the band is aligned in a null of the frequency spectrum of the spread spectrum radio.

In addition to operating in conjunction with a wireless headset, the micro-radio can function as a wireless peripheral port so that the operator may print a dataform label without physically connecting the dataform reader to a printer. Printers or other peripheral devices with similar micro radio boards may be placed throughout the installation in which the terminal is operated. When an operator approaches the peripheral device with the terminal, a hand shake sequence is initiated and a wireless link is established. Data from the terminal may be printed out on the peripheral device.

Because the dataform reader of this invention is intended for portable use it is desirable that the power source 48 provide for operation over an extended period of time without requiring recharging. Although the power source 48 could be any rechargeable cell, the preferable power source is a plurality of Lithium Polymer flexible battery cells. Each flexible sheet is about 0.002" (2 mils) thick and appears to be a sheet of plastic. To construct such a cell, $LiMn_2O_4$ is used as the cathode and carbon as the anode. Such a cell is available from Bellcore of Red Bank N.J. One advantage of the lithium polymer cells is that the flexible sheet form factor is such that the cells may be folded and placed in areas of the housing which are of inadequate space for traditional cylindrical cells. In FIG. 9, the polymer sheet cells 48 are advantageously shown along the surface of the housing interior wherein the polymer cells also function to reduce unwanted EMS. In addition to the form factor and EMS advantages, the lithium polymer cells are rechargeable and provide about 3 times the energy density as the NiCad cells and do not suffer the NiCad crystallization that produces the degenerative memory effect.

While the description has described the currently preferred embodiments of the invention, those skilled in the art will recognize that other modifications may be made without departing from the invention and it is intended to claim all modifications and variations as fall within the scope of the invention.

What is claimed:

1. An extended working range dataform reader for reading a dataform positioned in a target area, said reader comprising:
   (a) an image sensor, including an array of photosensor elements generating a signal representative of a dataform in the target area,
   (b) an optic system including two substantially identical lens elements positioned with mirrored symmetry about an aperture for canceling optic distortion,
   (c) support structure securing said image sensor at a fixed position relative to said optic system; and
   (d) an illumination system comprising a plurality of sources of light which provides illumination with an intensity variation of less than 20% across said target area, said illumination system including an optic system for directing the illumination to a field substantially the same size as the field of view of said optic system, said optic system including a plurality of lens elements each having a focal point, said illumination sources being positioned between said lens element and said focal point.

2. An extended working range dataform reader for reading a dataform positioned in a target area, said reader comprising:
   (a) an image sensor, including a two dimensional array of photosensor elements generating a signal representative of a complete two dimensional dataform in the target area,
   (b) an optic system including at least one lens element for focusing an image of said dataform onto said image sensor, said optic having an F# of equal to or greater than F#5.6,
   (c) support structure securing said image sensor at a fixed position relative to said optic system;
   (d) said optical system further including an aperture through which light reflected from said target area passes to be incident upon said image sensor; and
   (e) an illumination system comprising a plurality of sources of light which provides illumination with an intensity variation of less than 20% across said target area;
   said illumination system including an optic system for directing the illumination to a field substantially the same size as the field of view of said optic system, said optic system including a plurality of lens elements each having a focal point, said illumination sources being positioned between said lens element and said focal point.

3. An extended working range dataform reader for reading a dataform positioned in a target area, said reader comprising:
   (a) an image sensor, including a two-dimensional array of photosensor elements generating a signal representative of a dataform in the target area,
   (b) an optic system including at least one lens element for focusing an image of said target area onto said image sensor, and (c) an illumination system including a plurality of illumination sources, each source positioned behind an optic element, the optic element having a focal point, said illumination source being positioned between said focal point and said optical element.

4. The dataform reader as in claim 3, wherein, said optical system further includes an aperture through which light reflected from said target area passes to be incident upon said image sensor and the F# of said optical system is at least F#5.6.

5. The dataform reader of claim 4, wherein the optical system F# is in the range of F#11 to F#16.

6. The dataform reader of claim 5 wherein, said at least one lens element includes at least one aspherical surface for providing a substantially flat field image at said image sensor.

7. The dataform reader of claim 6, wherein, said optic system includes substantially identical two lens elements positioned with mirrored symmetry about a plane perpendicular to the optic axis of said optic system for canceling optic distortion.

8. A uniform illumination module comprising:

a plurality of illumination sources, each source having an illumination field, optic system for directing the illumination to a second illumination field, said second illumination field being narrower than said illumination field wherein said optic system including a plurality of lens elements each having a focal point, said illumination sources being positioned between said lens element and said focal point.

9. The uniform illumination module of claim 8 further including a printed circuit board to which said plurality of illumination sources are secured.

10. The uniform illumination module of claim 9 wherein said lens elements overlap to provide illumination cross talk between elements.

11. The uniform illumination module of claim 9 wherein the illumination sources are insert molded into the optic system.

* * * * *